Feb. 16, 1954

C. J. BUELL 2,669,098

REFRIGERATING SYSTEM FOR TRUCKS

Filed Jan. 3, 1950

Charles J. Buell
INVENTOR.

BY
*Attorneys*

Feb. 16, 1954  C. J. BUELL  2,669,098
REFRIGERATING SYSTEM FOR TRUCKS
Filed Jan. 3, 1950  3 Sheets-Sheet 2
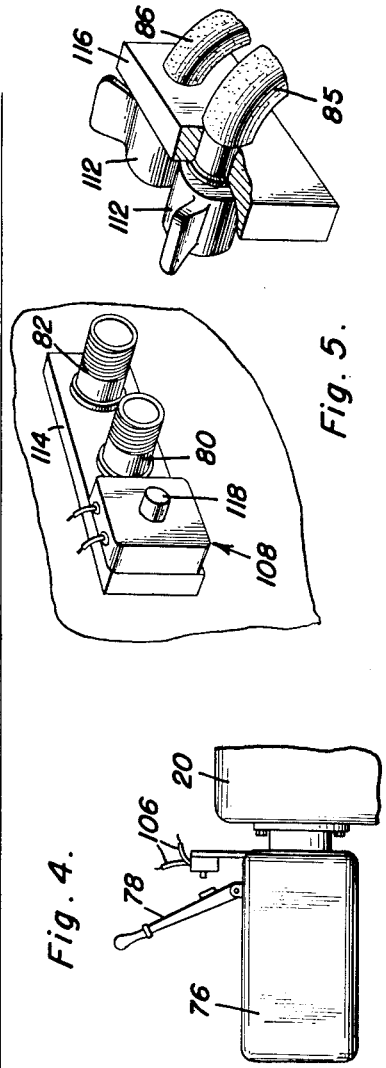
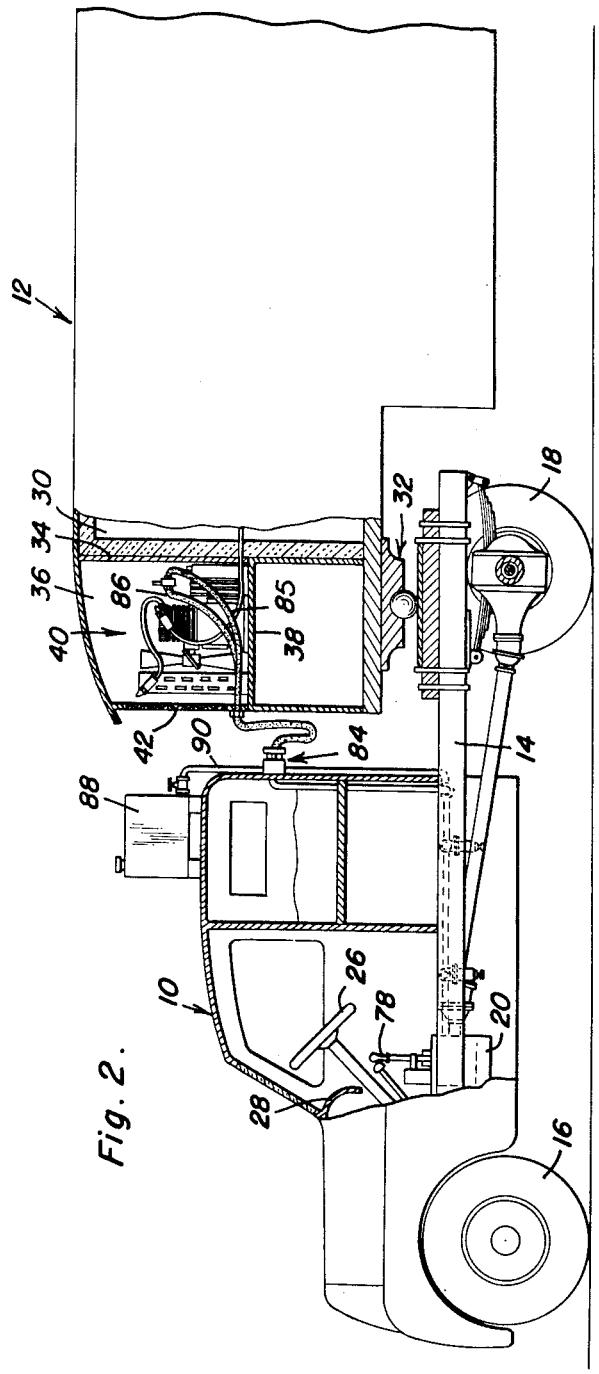
Charles J. Buell
INVENTOR.
BY *Clarence A. O'Brien*
*and Harvey B. Jackson*
Attorneys Feb. 16, 1954  C. J. BUELL  2,669,098
REFRIGERATING SYSTEM FOR TRUCKS
Filed Jan. 3, 1950  3 Sheets-Sheet 3

Charles J. Buell
INVENTOR.
BY *Clarence A. O'Brien*
*and Harvey B. Jacobson*
Attorneys Patented Feb. 16, 1954

2,669,098

UNITED STATES PATENT OFFICE 2,669,098

REFRIGERATING SYSTEM FOR TRUCKS

Charles J. Buell, Fort Smith, Ark.

Application January 3, 1950, Serial No. 136,618

12 Claims. (Cl. 62—117.1)

The present invention relates generally to mobile refrigeration systems, and more particularly pertains to a compressor type refrigerator or the like disposed in an automotive trailer, the compressor of which is normally driven by hydraulic means operatively connected to the prime mover of the trailer towing tractor, so that the refrigerator compressor may be driven by the tractor engine anytime the trailer is coupled thereon whether the tractor is in motion or standing idle, and which compressor may be alternatively driven by an electric motor carried by the trailer, whether the trailer is coupled to the tractor or not, together with totally automatic safety means for bypassing the hydraulic means under certain conditions as well as manual means therefor that may be operated from the tractor operator position.

The primary object of this invention is the preservation of perishables by means of refrigeration, and more especially to so preserve such goods during transit of the same in automotive transport trailers, both during the time that such a trailer is coupled to a tractor and moving, as well as when the same is stationary regardless of whether the same is coupled to the towing tractor or not.

Another important object of this invention is to supply continuous power to a compressor type refrigerator which is disposed in a trailer, which power may be alternatively derived from the prime mover of the tractor or from a source external of the tractor and trailer so that the latter source of power may be supplied to the compressor absolutely independently of the presence or absence of the tractor.

Another important object of this invention, in accordance with the foregoing objects, is to provide a refrigeration system of this character in which there will be no interference between the alternative drive means for the compressor and in which only one of the sources of power may be operative at a time.

Still another important object of this invention is to provide in conformity with the foregoing objects means whereby hydraulic lines that normally transmit power from a prime mover of the tractor to the refrigerator compressor will be bypassed at any time the power for the compressor is derived from an external source, as well as whenever the tractor and trailer are uncoupled with the hydraulic pump operating.

A meritorious feature of the present invention resides in the means provided to bypass the tractor portion of the hydraulic lines upon the uncoupling of the hydraulic lines connecting the hydraulic pump and the hydraulic motor, when the power take-off is engaged together with the means for manually bypassing the same disposed at the tractor operator's position.

Another important feature of the present invention resides in the means provided for bypassing the trailer portion of the hydraulic line whenever the electric motor is energized irrespective of whether or not the hydraulic lines are coupled to connect the pump and the motor.

A final important feature to be specifically enumerated herein resides in the drive connection between the electric motor and the hydraulic motor and the condenser fan being disposed on the armature shaft of the electric motor, so that the condenser fan will rotate when either of the motors is directly actuated, whereby the electric motor has the alternative function of serving solely as a bearing for the fan when the hydraulic pump is actuated and the electric motor is not energized.

These, together with various ancillary features and objects of the invention which will later become apparent as the following description proceeds, are attained by the present invention, a preferred embodiment of which has been illustrated by way of example only in the accompanying drawings, wherein:

Figure 2 is a side elevational view, partly in section, of a tractor and a portion of a trailer and having the subject matter of the present invention incorporated therein;

Figure 4 is an enlarged side elevational detail view of the power take-off and hydraulic pump, and illustrating particularly the interlock switch associated with the power take-off; and, Figure 5 is an enlarged exploded perspective view of the hydraulic coupling and the associated coupling interlock switch.

Figure 1:
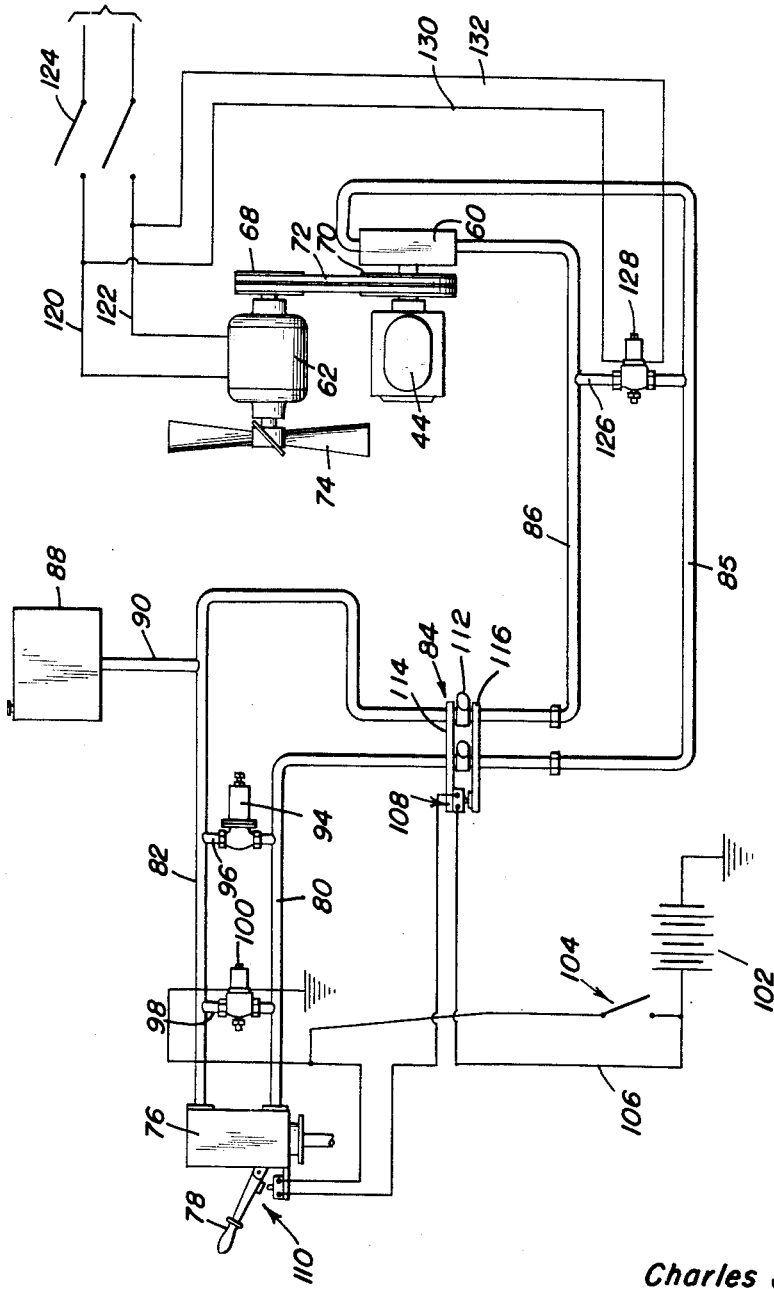
Figure 1 is a diagrammatic view of an embodiment in accordance with the principles of the present invention.

Reference is now made more specifically to the accompanying drawings, wherein like numerals designate similar parts throughout the various views, and in which the numeral 10 indicates an automotive tractor generally and the numeral 12 likewise designates generally an automotive refrigerator trailer.

The tractor 10 conventionally includes a frame 14, dirigible wheels 16, driving wheels 18, a motor (not shown), a transmission 20 associated with such motor, and a shifting lever 22 associated with such transmission 20. In addition, as in conventional tractors, the tractor 10 includes an operator's compartment 24 in which the vehicle steering wheel 26 is disposed as well as an instrument dash panel 28.

The trailer 12, which although only a portion of the same is shown will be understood to include an insulated refrigerated compartment 30, to which compartment access is given by suitable doors at the sides of or at the rear of the trailer as will be readily understood. The forward end of the trailer 12 is swively and detachably coupled to the rear of the tractor 10 by any suitable means 32. A partition 34 divides the refrigerator compartment 30 from a refrigerating unit compartment 36 situated in the forward end of the trailer 12, and it is upon a suitable platform 38 disposed in the chamber 36 that the refrigerating unit indicated generally at 40 is mounted. The compartment 36 is suitably ventilated as by a screen mesh 42 so as to afford adequate cooling for the refrigerating unit 40 as will be understood.

Figure 3:
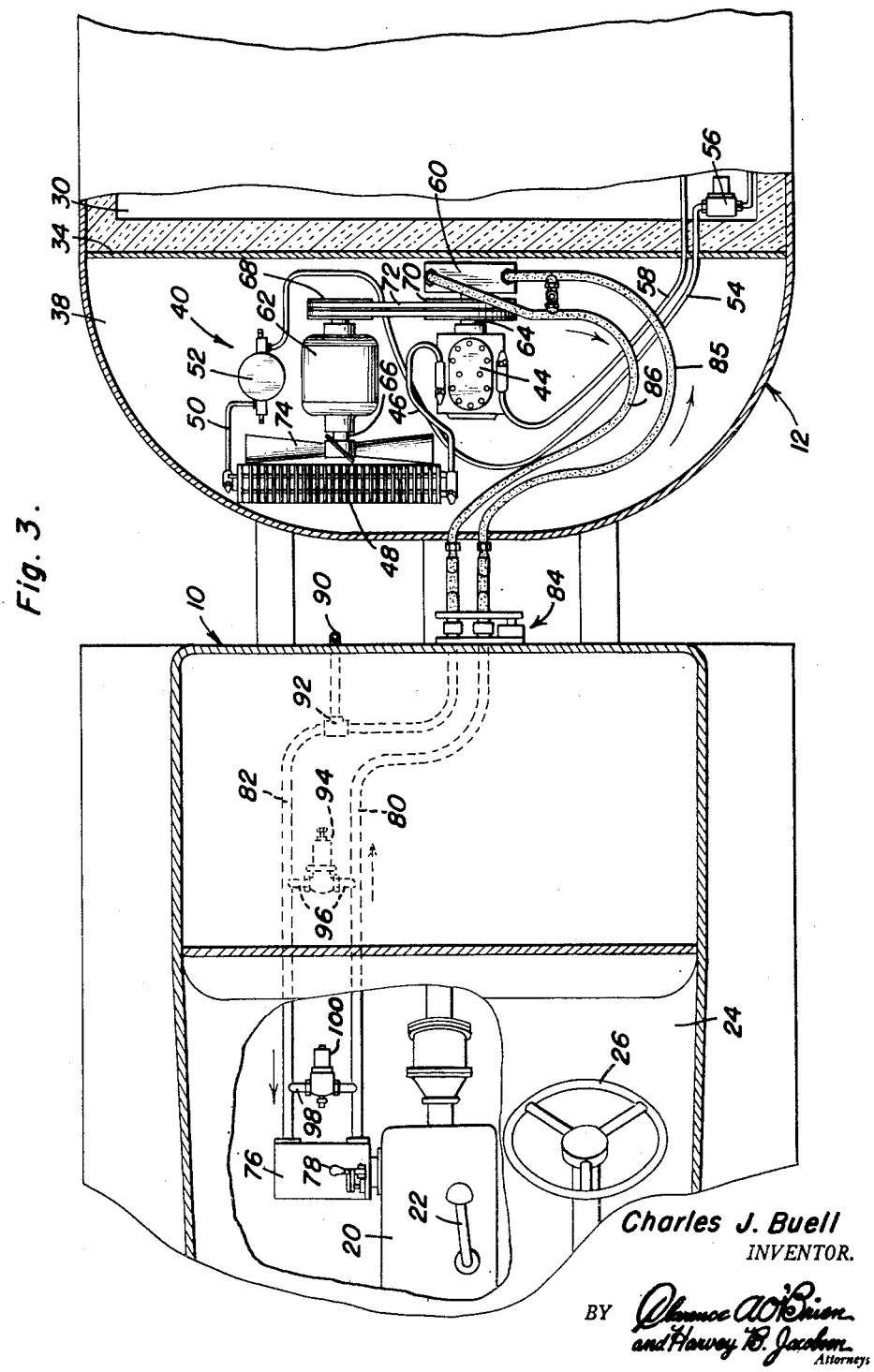
Figure 3 is a top plan view of the refrigeration system as shown in Figure 2, with portions of the tractor and trailer being broken away and shown in section and certain portions of the refrigeration system that are concealed being shown in dotted outline.

As best shown in Figure 3, the refrigerating unit 40 includes a compressor 44, the pressure side of which communicates through tubing 46 with a condenser 48 that is in turn connected by means of tubing 50 to a refrigerant reservoir 52. As in conventional refrigerating units, the reservoir 52 communicates through tubing 54 with an expansion valve 56 and thence through suitable refrigeration coils of any type desired, not shown, to return tubing 58 communicating with the low pressure side of the compressor 44.

Means is provided to drive the compressor 44, which includes a hydraulic motor 60 that is in turn itself driven by a means to be presently described, and an electric motor 62. The compressor 44 and the hydraulic motor 60 share a common shaft 64, or if desired, may have separate shafts that are directly coupled so that they may rotate in unison. One end of the armature shaft 66 of the electric motor 62 is provided with pulleys 68 and the shaft 64 is also provided with pulleys 70, pulley belts 72 being entrained over the pulleys 68 and 70 whereby the armature shaft 66 and the shaft 64 will rotate in unison. The other end of the armature shaft 66 is provided with a condenser fan 74 disposed to drive air through the condenser 48 upon rotation of the armature shaft 66 for cooling the same and driving heated air out of the compartment 36.

Suitably secured to the transmission 20 is a combined power take-off and hydraulic pump 76, the power take-off being preferably of the type delivering different speed ratios of power to the hydraulic pump, and also in which the speed ratio is selected by means of a control lever 78 extending into the operator's compartment 24 and which will in addition to enabling the operator to select a desired speed ratio will enable him to also operatively disconnect the hydraulic pump from the transmission 20. A hydraulic pressure line and a hydraulic return line 80 and 82 respectively extend rearwardly from the hydraulic pump 76 and terminate in a coupling assembly indicated generally at 84. A hydraulic pressure line and a hydraulic return line 85 and 86 respectively are connected to the hydraulic motor 60 and extend forwardly thereof to terminate in the coupling assembly 84. It will be understood that when the coupling assembly 84 is coupled that the hydraulic pump 76 will drive a suitable hydraulic fluid through the lines 80, 85, to the hydraulic motor 60 to rotate the same, and that the hydraulic fluid will return through the lines 86 and 82 to the pump 76. An adequate supply of hydraulic fluid is assured by the provision of a hydraulic fluid reservoir 88 carried by the tractor 10, which reservoir is suitably connected by conduit 90 and a T-connection to the return line 82. A pressure relief valve 94 is connected by a suitable coupling 96 between the pressure line 80 and the return line 82 that will in the event of the pressure in the line 80 exceeding a predetermined minimum value, relieve such pressure into the return line 82 as will be appreciated.

Means is provided to bypass the hydraulic lines 80 and 82 at the option of the tractor operator or when the coupling assembly 84 is uncoupled when the power take-off is engaged. As shown best in Figures 1 and 3, these means include a bypass line 98 connecting the lines 80 and 82 and having a solenoid actuated valve 100 therein. A battery 102, preferably the main battery of the tractor 10, is provided, one terminal of which is grounded to a suitable portion of the tractor frame. One electrical terminal of the solenoid actuated valve 100 is likewise suitably grounded to the tractor frame and the other terminals of the battery and the solenoid terminate in a suitable switch 104 situate on the dash panel 28 of the tractor 10, the arrangement being such that upon closing the switch 104 the circuit through the solenoid is completed to actuate the solenoid and open the valve controlled thereby. In parallel with the switch 104 is an electrical conductor 106 which includes a coupling interlock switch 108 associated with the coupling assembly 84 and a power take-off interlock switch 110 associated with the take-off and hydraulic pump 76 and disposed to be actuated by the control lever 78. The arrangement of the control lever 78 and the interlock switch 110 is such that when the lever 78 is in position so as to drive the hydraulic pump from the transmission 20, that the interlock switch 110 will be closed so as to complete the circuit therethrough. As shown best in Figures 1 and 5, the coupling assembly 84 is such that when the lines 80 and 82 are coupled to the lines 84 and 86 respectively by means of the fittings 112 that the coupling plates 114 and 116 will be in such close proximity that the plunger button 118 of the coupling interlock switch 108 will be depressed by the plate 116 to open the switch 108, such switch 108 being carried by the plate 114. It will be understood that the button 118 is normally resiliently urged outward to a position closing the switch 108 when the coupling assembly 84 is uncoupled so that the switch 108 is closed, so that if the switch 110 is also closed that the solenoid actuated valve 100 will be open to bypass the lines 80 and 82 in order to prevent damage to the hydraulic system when the tractor 10 and the trailer 12 and the associated hydraulic lines are uncoupled. Therefore it will be seen that the hydraulic lines 80 and 82 may be bypassed at the option of the operator and that the same will be automatically bypassed when the hydraulic pump 76 is operating and the hydraulic coupling 84 is uncoupled.

Electrical leads 120 and 122 are provided for the electric motor 62, a switch 124 being provided in the leads 120 and 122 for cutting off the motor 62 when the outer extremities of the lines 120 and 122 are connected to a suitable external source of supply of energy, not shown. Means is provided to bypass the hydraulic lines 85 and 86 upon energizing the leads 120 and 122 when the switch 124 is closed, such means including a bypass line 126 connecting the hydraulic lines 85 and 86, which bypass line 126 is provided with a solenoid actuated bypass valve 128. The terminals of the solenoid of the solenoid actuated valve 128 are connected by means of electrical conduits 130 and 132 to the electrical leads 120 and 122 respectively, so that the solenoid is in parallel with the windings of the electric motor 62 in order that the solenoid may be actuated to open the bypass valve 128 upon energizing the electric motor 62.

It will be noted that the hydraulic motor 60 will upon energizing the electric motor 62 act as a hydraulic pump and that opening the valve 128 to bypass the lines 85 and 86 serves to prevent the same serving as a brake upon the electric motor 62, since it will be understood that the coupling assembly 84 will obviously be of such a type that the extremities of the lines 80, 82, 85 and 86 will be sealed adjacent the coupling assembly 84 upon uncoupling the same to prevent leakage.

The operation and the advantages of the present invention will be readily understood. It will be evident that when the coupling assembly 84 is coupled that either with or without the hydraulic pump 76 operating that the hydraulic motor will be bypassed when and only when the electric motor 62 is energized, so that operation of the pump 76 will cause actuation of the compressor 44 through means of the hydraulic motor 60 until such time that the electric motor 62 is energized to directly actuate the compressor 44, at which time the hydraulic motor 60 is bypassed. As stated hereinbefore, whenever the coupling assembly 84 is uncoupled and the lever 78 positioned to operatively connect the transmission 20 to the hydraulic pump 76, the bypass valve 100 will bypass the pressure line to the return line. Accordingly, it will be apparent that the speed range of the hydraulic pump 76 available by means of the power take-off will permit the operator to maintain a relatively constant circulation of hydraulic fluid regardless of the speed of the tractor when in motion or whether the same is standing idle with the engine running, and that whenever the tractor is standing idle, either with the power take-off engaged or disengaged, the compressor 44 may be driven by connecting the electric motor 62 to an external electrical energy power source. Therefore, it will be seen that the present invention provides means whereby a refrigerated trailer may be maintained at the desired temperature, both during transit and during lay overs incidental to the transportation of goods either at the point of origin or at the destination or intermediate points.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications, equivalents may be resorted to, falling within the scope of the appended claims.

Having described the invention, what is claimed as new is:

1. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, means drivingly connecting the prime mover to the hydraulic pump, hydraulic pressure and return lines operatively connecting the pump and the motor, each of said lines including a first section carried by the tractor and a second section carried by the trailer, a separable coupling assembly between said first and second sections, said coupling assembly being operable to couple or uncouple the first and second sections of said lines, said coupling assembly being of the type which closes the lines when uncoupled, a bypass line connecting the second sections of the lines, a valve operatively disposed in the bypass line, an auxiliary motor carried by the trailer for driving the compressor, and an interlock responsive to actuation of the auxiliary motor for opening the valve in the bypass line.

2. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, means drivingly connecting the prime mover to the hydraulic pump, hydraulic pressure and return lines operatively connecting the pump and the motor, each of said lines including a first section carried by the tractor and a second section carried by the trailer, a separable coupling assembly between said first and second sections, said coupling assembly being operable to couple or uncouple the first and second sections of said lines, said coupling assembly being of the type which closes the lines when uncoupled, a bypass line connecting the first sections of the lines, a valve operatively disposed in the bypass line, control means responsive to the operation of said detachable couplings for controlling said valve, a further bypass line connecting the second sections of the lines, a further valve operatively disposed in the further bypass line, an auxiliary motor carried by the trailer for driving the compressor, and valve actuating means responsive to actuation of the auxiliary motor for opening the further valve in the further bypass line.

3. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, a driving connection between the prime mover and the hydraulic pump, hydraulic pressure and return lines operatively connecting the pump and the motor, each of said lines including a first section and a second section, detachable couplings for coupling and uncoupling the first sections with respect to the second sections of the lines, said coupling being of the type which close the lines when uncoupled, a bypass line connecting the first sections of the lines, a valve operatively disposed in said bypass line, a solenoid operatively associated with the valve, and electric circuit means connected to the solenoid and including an electric interlock operatively associated with the detachable couplings for controlling said solenoid, the arrangement being such that the valve is opened in response to uncoupling of the sections.

4. A vehicular mounted refrigeration system comprising, a tractor having a primer mover, a refrigerated trailer detachably coupled to the tractor, trailer refrigerating means on the trailer including a compressor, a hydraulic motor on the trailer operatively connected to the compressor, a hydraulic pump on the tractor, a transmission drivingly connecting the prime mover to the hydraulic pump, hydraulic pressure and return lines operatively connecting the pump and the motor, each of said lines including a first section carried by the tractor and a second section carried by the trailer, couplings for selectively coupling and uncoupling the first sections with respect to the second sections of the lines, a bypass line connecting the second sections, a valve operatively disposed in the bypass line, an electric motor drivingly connected to the compressor, an electric solenoid operatively connected to the valve, and electric circuit means for simultaneously energizing the electric motor to drive the compressor and the solenoid to open the valve.

5. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, a transmission drivingly connecting the prime mover to the hydraulic pump, hydraulic pressure and return lines operatively connecting the pump and the motor, each of said lines including a first section carried by the tractor and a second section carried by the trailer, a separable coupling assembly between said first and second sections, said coupling assembly being operable to couple or uncouple the first and second sections of said lines, said coupling assembly being of the type which closes the lines when uncoupled, a bypass line connecting the first sections of the lines, an electric solenoid actuated valve operatively disposed in the bypass line, an electric circuit including an electric interlock switch operatively associated with the coupling means for opening the valve in response to uncoupling the sections, an electric motor carried by the trailer and drivingly connected to the compressor, a further bypass line connecting the second sections of the lines, a further electric solenoid actuated valve operatively disposed in the further bypass line, and electric circuit means for simultaneously energizing the electric motor to drive the compressor and the further valve to open the further bypass line.

6. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, a transmission for establishing a driving connection between the prime mover and the hydraulic pump, hydraulic pressure and return lines operatively connecting the pump and the motor, each of said lines including a first section carried by the tractor and a second section carried by the trailer, couplings for coupling and uncoupling the first sections with respect to the second sections of the lines, said couplings closing the lines when uncoupled, a bypass line connecting the first sections, a normally closed electric solenoid actuated valve operatively disposed in the bypass line, and electrical means for opening said valve only when the sections of the lines are uncoupled and the prime mover is drivingly connected to the hydraulic pump, said electrical means including electric switches arranged in electrical series circuit relation and operatively associated with the transmission and with the coupling means.

7. A vehicular mounted refrigeration system comprising, a tractor having a prime mover, a refrigerated trailer detachably coupled to the tractor, trailer refrigerating means on the trailer including a compressor, a hydraulic motor on the trailer operatively connected to the compressor, a hydraulic pump on the tractor, a transmission for establishing a driving connecting between the prime mover and the hydraulic pump, hydraulic pressure and return lines operatively connecting the pump and the motor, each of said lines including a first section carried by the tractor and a second section carried by the trailer, couplings for coupling and uncoupling the first sections with respect to the second sections of the lines, said couplers closing the lines when uncoupled, a bypass line connecting the first sections, a normally closed electric solenoid actuated valve operatively disposed in the bypass line, electrical means for opening said valve when the sections of the lines are uncoupled and the prime mover is drivingly connected to the hydraulic pump, said electrical means including electric switches arranged in electrical series circuit relation and operatively associated with the transmission and with the coupling means, and an electric conductor bridging the switch means, and a manually operable electric switch disposed in the conductor, whereby the operator of the tractor may open the valve at his option.

8. For use in mobile refrigerating systems, a hydraulic pump and a hydraulic motor, hydraulic pressure and return lines operatively connecting the pump and the motor, each of said lines including first and second sections connected to the pump and the motor respectively, couplers for coupling and uncoupling the first sections with respect to the second sections of the lines, said couplers closing the lines when uncoupled, a bypass line connecting the first sections, a normally closed valve operatively disposed in the bypass line, means responsive to uncoupling the sections to open the valve, an auxiliary motor drivingly connected to the hydraulic motor, a further bypass line connecting the second sections, a further normally closed valve operatively disposed in the further bypass line, and valve actuating means responsive to actuation of the auxiliary motor to open the further valve.

9. In a refrigerating system having a compressor and a condenser, a driving system comprising an electric motor, a condenser fan on the shaft of said motor, a pulley mounted on the shaft of said motor, a hydraulic motor, a drive shaft for said compressor, said hydraulic motor being mounted on the said drive shaft, a pulley mounted on said drive shaft, flexible drive means entrained over said pulleys, a hydraulic supply line connected to said hydraulic motor, a fluid return line connected to said hydraulic motor for operating said hydraulic motor from a source of fluid pressure, a by-pass line connected between said supply line and said return line, a normally closed valve in said by-pass line, a source of supply for said electric motor, electric operating means for said valve, said operating means being connected to said electric motor supply whereby energization of said electric motor energizes said operating means to open said valve.

10. For use with a towing vehicle having a prime mover and a trailer vehicle detachably coupled to said towing vehicle, a refrigeration system including a compressor mounted in the trailer, a condenser connected to said compressor, an electric motor mounted in the trailer, said electric motor being operatively connected to said compressor, a hydraulic pump mounted on the towing vehicle, a driving connection from said prime mover to said pump, a hydraulic motor mounted in the trailer, said hydraulic motor being operatively connected to said compressor, a hydraulic pressure line extending from said pump to said hydraulic motor, a hydraulic return line from said hydraulic motor to said pump, a by-pass line inter-connecting said pressure line and said return line adjacent to said pump, a normally closed valve in said by-pass line, a second by-pass line interconnecting said pressure line and said return line, adjacent to said hydraulic motor, a solenoid operated valve in said second by-pass, a coupling in said pressure line and in said return line intermediate said by-pass lines, an electric circuit connected to said electric motor, a circuit connecting said solenoid valve to said motor circuit whereby energization of said electric motor opens said second by-pass line, electric actuating means for said first normally closed valve, a switch responsive to uncoupling of said coupling for actuating said first valve.

11. For use with a vehicle arrangement having a towing vehicle with a prime mover power device therein and a refrigerated trailer detachably coupled to said towing vehicle, a refrigerating system comprising a refrigerant compressor carried by said trailer, a hydraulic motor carried by said tractor, said hydraulic motor being drivingly connected to said compressor, a hydraulic pump carried by said towing vehicle, a power transmission between the prime mover of said towing vehicle and said pump, a disconnector in said transmission, a hydraulic pressure line and hydraulic return line connecting the hydraulic pump and the hydraulic motor, a pair of by-pass lines connecting said hydraulic lines, a solenoid actuated valve in each by-pass line, said valves normally closing said by-pass lines, detachable couplings in said hydraulic lines intermediate said by-pass lines, an electric motor carried by said trailer, said electric motor being operatively connected to said compressor, an electric circuit connected to said motor and to the solenoid of the valve in the by-pass line adjacent to the hydraulic motor, whereby said by-pass line adjacent the hydraulic motor is opened when said electric motor is energized, a second electric circuit connected to the solenoid of the valve in the by-pass line adjacent to the pump, a switch in said circuit, said switch being responsive to uncoupling of said detachable couplings to energize said solenoid.

12. In a vehicular system having a tractor having a prime mover and a refrigerated trailer detachably coupled to said tractor, a vehicular mounted refrigerating system comprising refrigerating apparatus mounted on said trailer, said apparatus including a compressor, a hydraulic motor operatively connected to said compressor, a hydraulic pump mounted on said tractor, a driving connection between the prime mover and said pump, hydraulic pressure and return lines transmitting the pressure of the pump to said hydraulic motor, each of said lines including a first section and a second section, detachable couplings securing said first and second sections together, a by-pass line connecting the first sections of the lines, a normally closed valve in said by-pass line, electric means for opening said valve, an electric energizing circuit for said valve, a switch controlling said energizing circuit, said switch operating means carried by said couplings, said switch operating means opening said switch when said couplings are coupled.

CHARLES J. BUELL.

References Cited in the file of this patent

UNITED STATES PATENTS

| Number | Name | Date |
| --- | --- | --- |
| 767,027 | Wilkinson | Aug. 9, 1904 |
| 1,880,245 | Fourness et al. | Oct. 4, 1932 |
| 1,943,317 | Hulse | Jan. 16, 1934 |
| 2,059,830 | Warner | Nov. 3, 1936 |
| 2,077,974 | Wishart | Apr. 20, 1937 |
| 2,097,857 | Ferris et al. | Nov. 2, 1937 |
| 2,104,696 | Hanson | Jan. 4, 1938 |
| 2,212,503 | Nickell | Aug. 27, 1940 |
| 2,469,648 | House | May 10, 1949 |
| 2,516,508 | Donner | July 25, 1950 |
| 2,518,316 | Henry | Aug. 8, 1950 |
| 2,530,241 | Harrington | Nov. 14, 1950 |

FOREIGN PATENTS

| Number | Country | Date |
| --- | --- | --- |
| 741,080 | France | Dec. 2, 1932 |